(12) United States Patent
Biggerstaff

(10) Patent No.: US 9,686,916 B2
(45) Date of Patent: Jun. 27, 2017

(54) CLEANING SHOE MOG DISCHARGE SYSTEM

(71) Applicant: AGCO Corporation, Hesston, KS (US)

(72) Inventor: Joseph M. Biggerstaff, Wichita, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 14/769,269

(22) PCT Filed: May 12, 2014

(86) PCT No.: PCT/IB2014/000706
§ 371 (c)(1),
(2) Date: Aug. 20, 2015

(87) PCT Pub. No.: WO2014/181171
PCT Pub. Date: Nov. 13, 2014

(65) Prior Publication Data
US 2016/0073586 A1     Mar. 17, 2016

Related U.S. Application Data

(60) Provisional application No. 61/821,782, filed on May 10, 2013.

(51) Int. Cl.
*A01F 12/40* (2006.01)
*A01D 41/12* (2006.01)
*A01F 17/04* (2006.01)

(52) U.S. Cl.
CPC .......... *A01F 12/40* (2013.01); *A01D 41/1243* (2013.01); *A01F 17/04* (2013.01)

(58) Field of Classification Search
CPC ..... A01D 41/1243; A01F 29/12; A01F 12/40; Y10S 460/901
(Continued)

(56) References Cited

U.S. PATENT DOCUMENTS 4,669,489 A * 6/1987 Schraeder .............. A01F 12/40
                                                                241/186.3
5,797,793 A * 8/1998 Matousek .......... A01D 41/1243
                                                                460/111
(Continued)

FOREIGN PATENT DOCUMENTS

| EP | 1358789 A1 | 11/2003 |
|---|---|---|
| EP | 2225929 A1 | 9/2010 |
| WO | 92/05687 A1 | 4/1992 |

OTHER PUBLICATIONS

European Patent Office, International Search Report for International Patent Application PCT/IB2014/000706, date of mailing Sep. 25, 2014.

(Continued)

*Primary Examiner* — Árpád Fábián-Kovács

(57) ABSTRACT

A cleaning shoe material-other-than-grain (MOG) discharge system of a combine harvester has a thresher rotor assembly configured to produce a stream of thresher rotor MOG and a shoe disposed beneath the thresher rotor assembly configured to produce a stream of shoe MOG. A chopper receives and chops the stream of thresher rotor MOG. Vanes disposed at an outlet of the chopper distribute the chopped thresher rotor MOG. A plate having top and bottom surfaces is adjacent to the plural vanes. A duct is set on the plate, the duct having a first inlet and a first outlet, the first inlet disposed adjacent to an outlet of the shoe to receive the stream of shoe MOG, the first outlet disposed downstream of the outlet of the chopper such that the stream of shoe MOG is received in the stream of chopped thresher rotor MOG.

10 Claims, 7 Drawing Sheets

(58) Field of Classification Search
USPC ......... 241/186.3; 460/112, 111, 901; 56/504, 56/500
See application file for complete search history.

(56) References Cited

U.S. PATENT DOCUMENTS

| | | | | |
|---|---|---|---|---|
| 5,833,533 | A * | 11/1998 | Roberg | A01F 12/40 460/112 |
| 5,944,604 | A * | 8/1999 | Niermann | A01F 12/40 460/112 |
| 6,251,009 | B1 * | 6/2001 | Grywacheski | A01F 12/40 460/112 |
| 6,416,405 | B1 * | 7/2002 | Niermann | A01F 12/40 241/186.3 |
| 6,547,169 | B1 * | 4/2003 | Matousek | A01F 12/40 239/149 |
| 6,656,038 | B1 * | 12/2003 | Persson | A01F 12/40 460/112 |
| 6,881,145 | B2 * | 4/2005 | Holmen | A01D 41/1243 460/112 |
| 6,939,221 | B1 | 9/2005 | Redekop | |
| 7,066,810 | B2 * | 6/2006 | Farley | A01D 41/1243 460/112 |
| 7,648,413 | B2 * | 1/2010 | Duquesne | A01D 41/127 460/112 |
| 7,717,779 | B1 | 5/2010 | Weichholdt et al. | |
| 8,029,347 | B2 * | 10/2011 | Pohlmann | A01D 41/1243 460/112 |
| 2003/0003974 | A1 * | 1/2003 | Niermann | A01D 41/1243 460/111 |
| 2003/0109294 | A1 * | 6/2003 | Wolters | A01F 12/40 460/112 |
| 2003/0114207 | A1 * | 6/2003 | Wolters | A01F 12/40 460/111 |
| 2004/0029624 | A1 * | 2/2004 | Weichholdt | A01F 12/40 460/112 |
| 2004/0053652 | A1 * | 3/2004 | Duquesne | A01D 41/1243 460/112 |
| 2004/0092298 | A1 | 5/2004 | Holmen | |
| 2004/0137974 | A1 | 7/2004 | Weichholdt | |
| 2004/0176150 | A1 | 9/2004 | Gryspeerdt et al. | |
| 2004/0176151 | A1 * | 9/2004 | Gryspeerdt | A01F 12/40 460/112 |
| 2004/0242291 | A1 * | 12/2004 | Weichholdt | A01D 41/1243 460/112 |
| 2005/0124399 | A1 * | 6/2005 | Holmen | A01D 41/1243 460/111 |
| 2005/0124400 | A1 * | 6/2005 | Schmidt | A01D 41/1243 460/111 |
| 2005/0282602 | A1 | 12/2005 | Redekop et al. | |
| 2006/0073860 | A1 * | 4/2006 | Redekop | A01F 12/40 460/112 |
| 2006/0246965 | A1 * | 11/2006 | Lauer | A01F 12/40 460/111 |
| 2007/0066370 | A1 * | 3/2007 | Redekop | A01D 41/1243 460/112 |
| 2008/0234019 | A1 * | 9/2008 | Teroerde | A01F 12/444 460/100 |
| 2008/0305842 | A1 * | 12/2008 | Benes | A01F 12/40 460/112 |
| 2009/0042625 | A1 * | 2/2009 | Dow | A01D 41/1243 460/112 |
| 2009/0042626 | A1 * | 2/2009 | Weichholdt | A01D 41/1243 460/114 |
| 2009/0156277 | A1 * | 6/2009 | Benes | A01D 41/1243 460/112 |
| 2009/0325659 | A1 * | 12/2009 | Overschelde | A01D 41/1243 460/112 |
| 2010/0120482 | A1 * | 5/2010 | Holmen | A01D 41/1243 460/112 |
| 2010/0184494 | A1 * | 7/2010 | Klein | A01D 41/1243 460/112 |
| 2011/0045883 | A1 * | 2/2011 | Weichholdt | A01D 41/1243 460/112 |
| 2011/0053668 | A1 * | 3/2011 | Weichholdt | A01D 41/1243 460/112 |
| 2011/0053669 | A1 * | 3/2011 | Weichholdt | A01D 41/1243 460/112 |
| 2011/0130181 | A1 * | 6/2011 | Roberge | A01D 41/1243 460/111 |
| 2013/0324199 | A1 * | 12/2013 | Roberge | A01D 41/1243 460/111 |
| 2014/0364179 | A1 * | 12/2014 | Brinkmann | A01D 41/1243 460/112 |
| 2015/0351322 | A1 * | 12/2015 | Desmet | A01D 41/1243 460/114 |
| 2016/0088794 | A1 * | 3/2016 | Baumgarten | A01D 41/127 460/1 |

OTHER PUBLICATIONS

Intellectual Property Office, International Search Report for proceeding UK Patent Application GB1403683.4, dated Sep. 3, 2014.

* cited by examiner

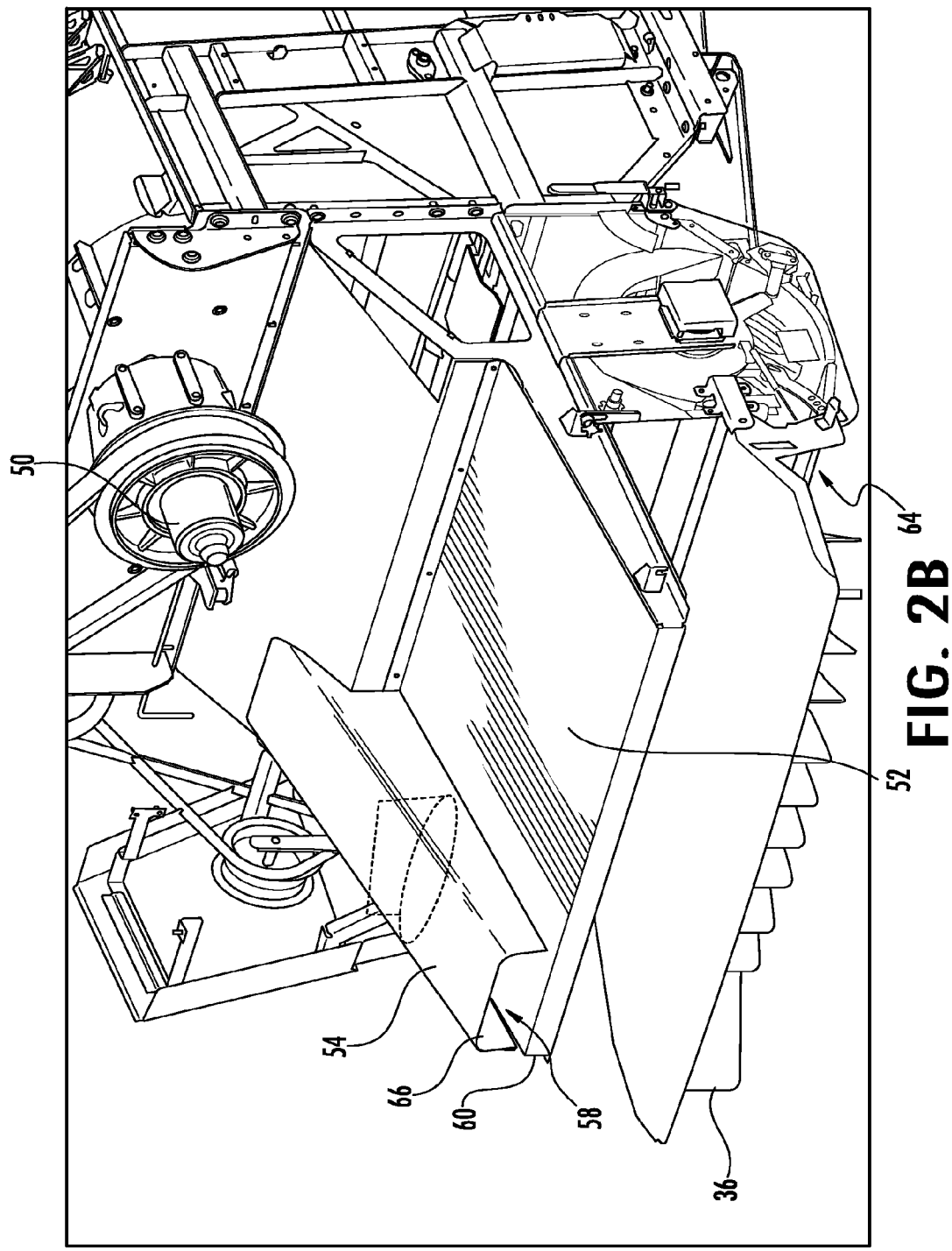

CLEANING SHOE MOG DISCHARGE SYSTEM

TECHNICAL FIELD

The present disclosure is generally related to agricultural systems and, more particularly, combine harvester residue discharge systems.

BACKGROUND

Combine harvesters are provided with a processing system comprising a thresher rotor assembly, as well as a cleaning system. The thresher rotor assembly typically comprises a thresher rotor or cylinder and one or more arcuate, foraminous concaves and separator grate assemblies, through which crop material threshed by the thresher rotor pass to the cleaning system and large residue such as stalks are discharged from the thresher rotor assembly to a chopper. The threshed crop material may comprise kernels of grain, chaff, small pieces of stalk or straw, etc. The cleaning system is used to remove chaff and other residue from, for instance, the threshed grain. Within the cleaning system, an oscillating cascade pan and sieve assemblies of a shaker shoe assembly (hereinafter, also simply shoe), in conjunction with air flow, remove the chaff from the threshed grain. The cleaned grain is conveyed to a discharge auger that elevates the grain to an onboard storage bin, whereas residue such as material-other-than-grain (or MOG) and possibly unthreshed grain is directed over the edge of a bottom sieve assembly of the shoe to a different discharge outlet for recirculation back through the thresher rotor assembly and cleaning system to extract any unthreshed grain. A fan of the cleaning system produces an airstream through the shoe that entrains the lighter, non-grain particles (chaff or generally, lighter MOG) and carries them out, at or towards the rear of the combine harvester.

Different methods have been developed to discharge the MOG to the field. Historically, combine harvesters have used the chopper to chop and spread rotor material and a chaff spreader to spread the shoe material. Recently, combine harvesters of some manufacturers reveal designs where both the shoe and rotor material are provided through a single chopper and distributed as a mix to the field. Although the latter design eliminates the chaff spreader, which reduces complexity, it also tends to choke the cleaning shoe, decreasing shoe performance. Some manufacturers have addressed the choke issue by introducing combine harvesters with ventilation or exhaust holes in the side of the cleaning shoe, which, though alleviating air choke issues, results in the deposit of the lighter MOG directly (e.g., undistributed, such as not distributed transversely at any given point in time) to the ground.

SUMMARY OF INVENTION

According to the invention there is provided a cleaning shoe, material-other-than-grain (MOG) discharge system of a combine harvester, the system comprising:
 a thresher rotor assembly;
 a shoe disposed beneath the thresher rotor assembly;
 a chopper;
 plural vanes disposed at an outlet of the chopper;
 a plate comprising a top surface and a bottom surface that is adjacent to the plural vanes; and
 a duct set on the plate, the duct having a first inlet and a first outlet, the first inlet disposed adjacent to an outlet of the shoe, the first outlet disposed downstream of the outlet of the chopper.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2B is a schematic diagram that illustrates, in fragmentary, rear-perspective view, an embodiment of the cleaning shoe MOG discharge system of FIG. 2A.

DESCRIPTION OF EXAMPLE EMBODIMENTS

Overview

Figure 1:
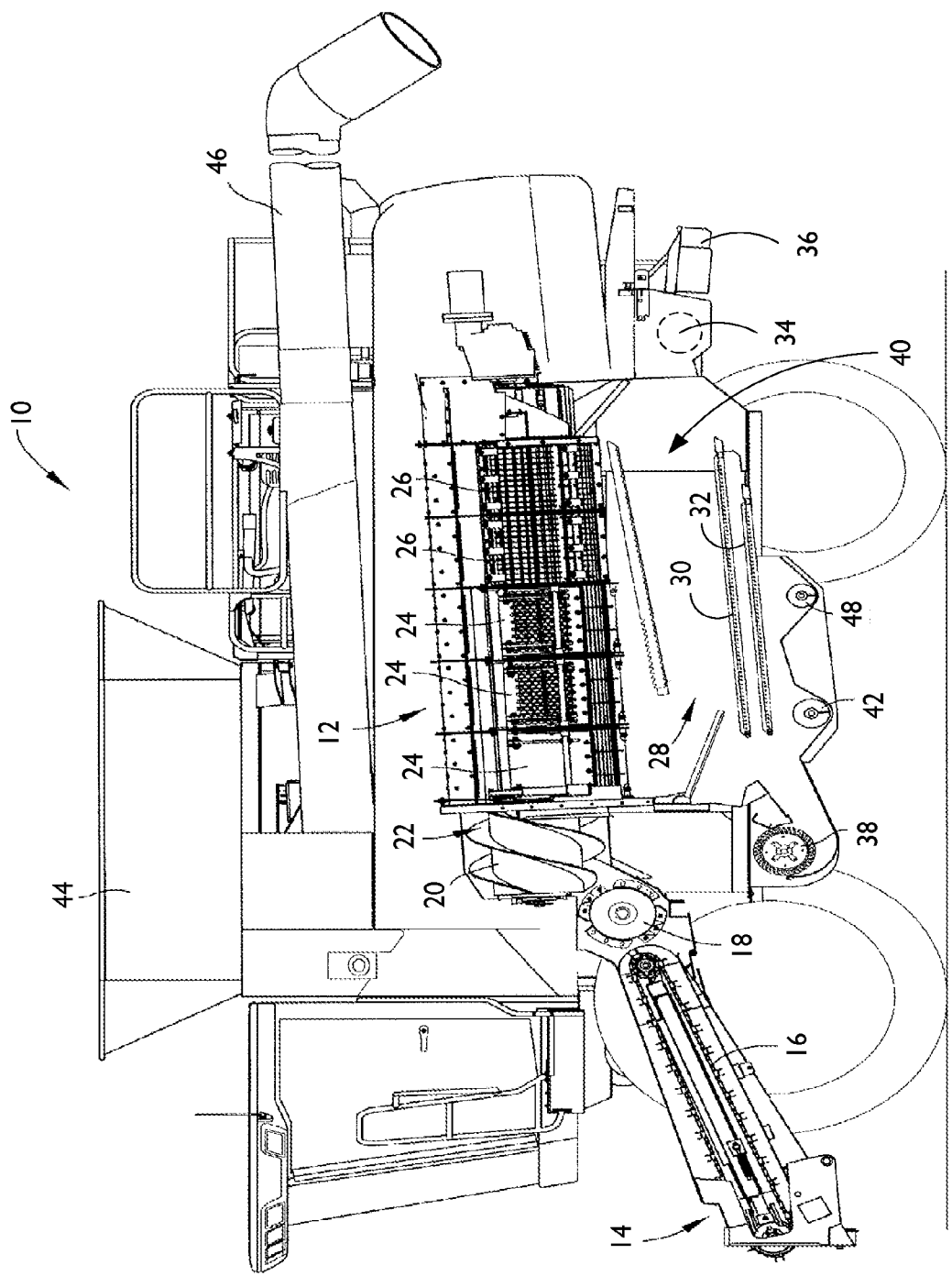
FIG. 1 is a schematic diagram that illustrates an example environment in which an embodiment of a cleaning shoe material-other-than-grain (MOG) discharge system may be implemented.

In one embodiment, a cleaning shoe, material-other-than-grain (MOG) discharge method of a combine harvester, the method comprising: discharging first MOG from a rotor assembly; chopping with a chopper the discharged first MOG; discharging second MOG from an outlet end of the shoe; and combining the second MOG with the chopped first MOG before the chopped first MOG and the second MOG reaches the ground, wherein the second MOG that is combined with the chopped first MOG is not chopped by the chopper.

Detailed Description

Certain embodiments of a cleaning shoe, material-other-than-grain (MOG) discharge system and method for a combine harvester are disclosed herein that mixes the shoe MOG discharge into a stream that the chopper discharges. In one embodiment, a cleaning shoe MOG discharge system comprises a duct with an inlet adjacent an outlet of a shaker shoe assembly (hereinafter, also simply shoe), and a chopper that receives at its inlet MOG from a thresher rotor assembly and an outlet for discharging the chopped MOG. The duct comprises one or more outlets that discharge the shoe MOG downstream of the chopper outlet. With such a structure and corresponding method, the combine harvester benefits from the exhaust of air from the shoe, yet the MOG that is directed into the chopper discharge stream and the shoe MOG gets spread onto the ground without the addition of any complex components.

Having summarized certain features of a cleaning shoe MOG discharge system of the present disclosure, reference will now be made in detail to the description of the disclosure as illustrated in the drawings. While the disclosure will be described in connection with these drawings, there is no intent to limit it to the embodiment or embodiments disclosed herein. For instance, though single, axial-based rotor designs are described herein for illustrative purposes, it should be appreciated within the context of the present disclosure that certain embodiments of cleaning shoe MOG discharge systems may be used in association with transverse rotor, twin-rotor, hybrid, conventional, and/or other combine core designs. Further, although the description identifies or describes specifics of one or more embodiments, such specifics are not necessarily part of every embodiment, nor are all of any various stated advantages necessarily associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", are made as viewed from the rear of the combine harvester looking forwardly. In addition, note that reference herein to threshed crop material refers to crop material that has been processed by the thresher rotor, which may (or may not) include at least a small portion of unthreshed grain.

Reference is made to FIG. 1, which illustrates an example environment, that is, a combine harvester 10, in which an example embodiment of a cleaning shoe MOG discharge system may be implemented. One having ordinary skill in the art should appreciate in the context of the present disclosure that the example combine harvester 10 depicted in FIG. 1 is merely illustrative, and that other combine designs may be used in some embodiments. The combine harvester 10 selected for illustration in FIG. 1 has a single axial flow processing system 12 that extends generally parallel with the path of travel of the machine. As is well understood by those having ordinary skill in the art, the combine harvester 10 includes a harvesting header (not shown) at the front of the machine that delivers collected crop materials to the front end of a feeder house 14. Such materials are moved upwardly and rearwardly within the feeder house 14 by a conveyor 16 until reaching a beater 18 that rotates about a transverse axis. The beater 18 feeds the material upwardly and rearwardly to a thresher rotor assembly, which includes in the depicted example a rotor 22 having an infeed auger 20 on the front end thereof. The infeed auger 20, in turn, advances the materials axially into the processing system 12 for threshing and separating. In other types of systems, a conveyor may deliver the crop directly to a threshing cylinder.

Generally speaking, the crop materials entering the processing system 12 move axially and helically therethrough during threshing and separating. During such travel the crop materials are threshed and separated by the rotor 22 operating in cooperation with foraminous processing members in the form of threshing concave assemblies 24 and separator grate assemblies 26, with the grain escaping laterally through the concave assemblies 24 and the grate assemblies 26 into a cleaning mechanism 28. The cleaning mechanism 28 comprises a shoe having oscillating sieve assemblies 30 and 32, as is known. Note that reference herein to thresher rotor assembly may include all or a portion of the processing system 12. Bulkier stalk and leaf materials are retained by the concave assemblies 24 and the grate assemblies 26 and are discharged out of the rear of processing system 12 to an inlet of one or more choppers (one shown schematically in phantom, denoted as chopper 34). The material discharged out of the rear of the processing system falls under gravity within a substantially central vertical passage into the chopper inlet 34.

The inlet of the chopper 34 may be disposed substantially above the chopper 34, as is known, collecting MOG to be chopped and discharged to the ground via plural vanes 36 and ultimately out of the rear of the machine. The chopper 34 may comprise a single rotary device that rotates about a transverse axis. In some embodiments, the chopper 34 may be comprised of a single or dual axial design, and hence these and/or other variations in chopper design are contemplated to be within the scope of the disclosure. A fan or blower 38 forms part of the cleaning mechanism 28 and provides a stream of air throughout the cleaning region below the processing system 12 and is directed at and beyond a shoe outlet 40 and out the rear of the machine (e.g., through one or more ducts as described below) so as to carry lighter chaff particles (e.g., shoe MOG) away from the grain as the grain migrates downwardly toward the bottom of the machine 10 to a clean grain auger 42. The clean grain auger 42 delivers the clean grain to an elevator (not shown) that elevates the grain to a storage bin 44 on top of the machine, from which it is ultimately unloaded via an unloading spout 46 (shown in the storage position). A returns auger 48 at the bottom of the cleaning region is operable in cooperation with other known mechanisms (not shown) to reintroduce partially threshed crop materials into the front of processing system 12 for an additional pass through the system, as should be appreciated by one having ordinary skill in the art.

Figure 2A:
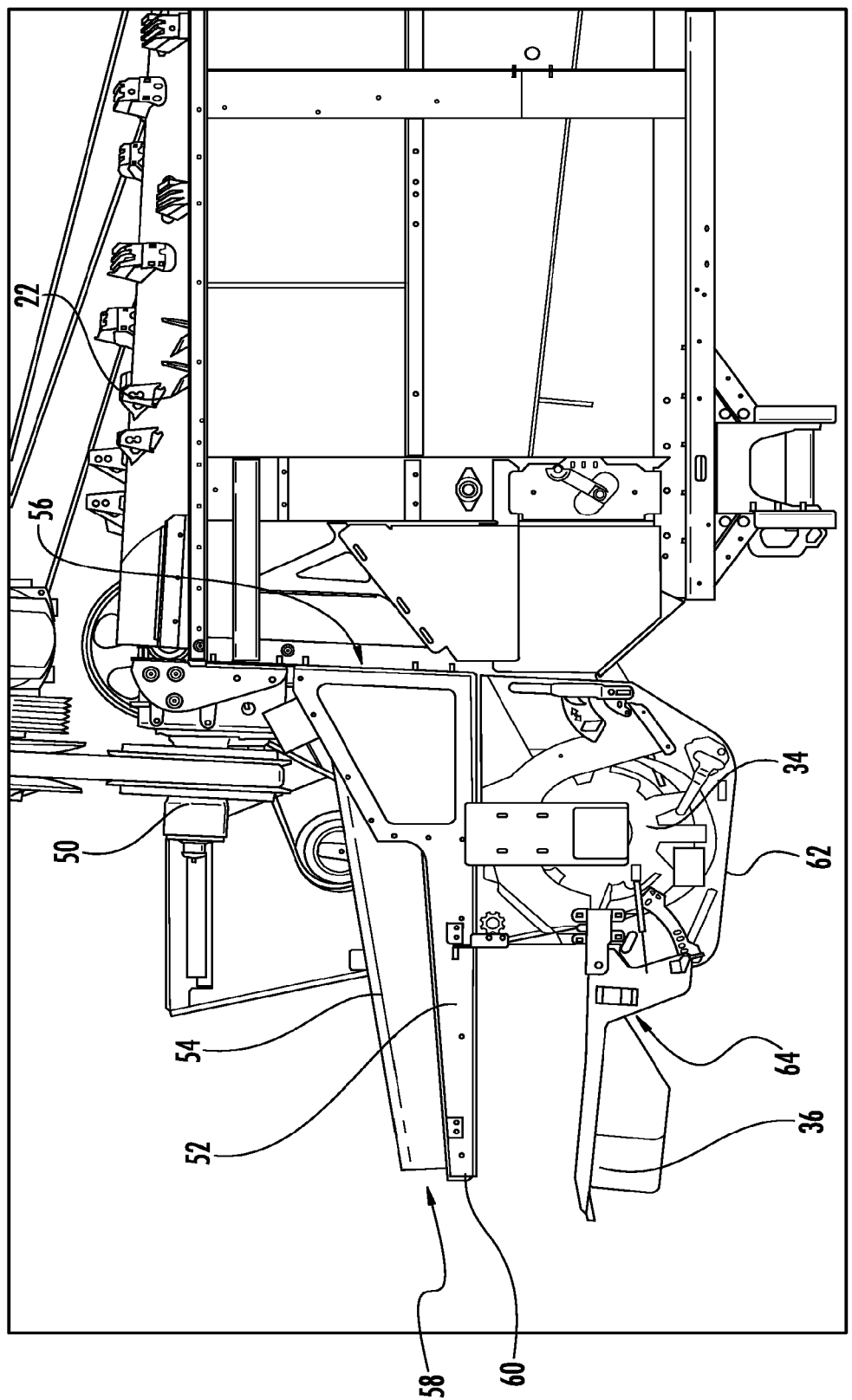
FIG. 2A is a schematic diagram that illustrates, in fragmentary, side-elevation view, an embodiment of a cleaning shoe MOG discharge system.

Having described some features of an example environment in which an embodiment of a cleaning shoe MOG discharge system may be implemented, attention is directed to FIG. 2A, which shows in side elevation view an embodiment of a cleaning shoe MOG discharge system. It should be appreciated that the cleaning shoe MOG discharge system depicted in FIG. 2A is illustrative, and that variations of the design are contemplated to be within the scope of the disclosure. Shown are portions of the rotor 22, including a rotor drive 50, which is depicted as belt-driven though other rotating mechanisms may be used to rotate the rotor 22. Located beneath the rotor drive 50 and above the chopper is a rearwardly extending plate 52 upon which a duct 54 rests or is generally set upon (e.g., mounted with fastening screws, adhesives, bolts, or rests based on gravity or secure and rigid attachment more forwardly, among other mechanisms).

The duct 54 comprises an inlet 56 adjacent the outlet 40 (FIG. 1) of the shoe, and an outlet 58. Although only a single duct is illustrated it is envisaged that more than one duct may be employed. For example, a pair of ducts may be provided, one located to each side of the vertical passage through which the material discharged by the rotor passes.

Turning back to FIG. 2, the outlet 58 is adjacent a rear edge 60 of the plate 52. Also shown is the chopper 34, which is at least partially surrounded by a housing 62 having an inlet at the top as is known (though in some embodiments, other locations for the inlet may be implemented). The housing 62 also comprises an outlet corresponding to an outlet 64 of the chopper 34. The outlet 64 is adjacent to, and forward of, the plural vanes 36. The plural vanes 36 disburse (e.g., distribute, such as rearwardly and transversely, among other directions) the chopped MOG received from the outlet 64 of the chopper 34 to the ground. Note that in some embodiments, the plate 52 and plural vanes 36 may be integrated as a single (e.g., molded or fabricated) structure.

The shoe MOG is propelled into the inlet 56 of the duct 54 by the cleaning wind generated by fan 38. The MOG from the thresher rotor assembly falls under gravity into the inlet to the housing 62 and hence the inlet to the chopper 34. It should be appreciated that the duct serves to convey the shoe MOG past that falling from the rear of the thresher rotor. The MOG from the thresher rotor assembly is chopped by the chopper 34, and the stream of chopped MOG is discharged from the outlet 64 of the chopper 34 and channeled by the plural vanes 36. The shoe MOG is discharged through the outlet 58 of the duct 54. Given the proximity of the outlet 58 of the duct 54 to the plural vanes 36, the shoe MOG discharged from the outlet 58 travels (e.g., influenced by the air flow from the blower 38, FIG. 1) past the rear edge 60 of the plate 52, which is adjacent the outlet end of the plural vanes 36. The shoe MOG enters the stream of chopped MOG from, in one embodiment, a location adjacent to an outlet end of the plural vanes 36 and is carried by the stream to the ground. In other words, the shoe MOG is mixed with the chopped MOG (e.g., before hitting the ground), and is collectively distributed to the ground (not directly dropped to the ground). The shoe MOG does not undergo a chopping operation by the chopper 34, though in some embodiments, an insignificant amount of shoe MOG proximal to the inlet 56 of the duct 54 may be carried into the chopper 34 via air flow.

FIG. 2B provides a rear perspective view of some of the components shown in FIG. 2A. For instance, depicted in FIG. 2B is the rotor drive 50, plate 52, duct 54 having an outlet 58, rear edge 60 of the plate 52, outlet of the chopper 34, and the plural vanes 36. The plural vanes 36 are shown with varying angles to enhance the distribution of the stream of MOG (chopped and un-chopped). In some embodiments, the plural vanes 36 may have different angles and/or be different in quantity than those shown in FIG. 2B. As described above, the shoe MOG is discharged from the outlet 58 of the duct 54, passing over the rear edge 60 of the plate 52 and into the stream of the chopped MOG at the outlet of the plural vanes 36. The outlet 58 comprises an edge 66 on multiple sides of the duct 54. In the embodiment depicted in FIG. 2B, the edge 66 is on the top, and two opposing sides of the duct 54. In some embodiments, the duct edge 66 may have fewer or additional sides, and in some embodiments, the duct 54 may be of a different geometry than the somewhat inverted U-shaped channel configuration depicted in FIG. 2B.

One embodiment of a cleaning shoe MOG discharge system may comprise the thresher rotor assembly, shoe, duct 54, plate 52, chopper 34, and the plural vanes 36. Some embodiments of a cleaning shoe MOG discharge system may comprise fewer or a greater quantity of components.

It should be appreciated within the context of the present disclosure that variations to the duct 54 and/or its relative arrangement on the plate 52 may be implemented, and hence such variations are contemplated to be within the scope of the disclosure. For instance, in some embodiments, as shown in phantom in FIG. 2B, the duct 54 may be truncated in length (e.g., at the dashed edge in the duct 54), wherein the shoe MOG discharged past an edge defining an outlet of the truncated duct impacts the plate 52 upstream (e.g., forward) of the rear edge 60. The shoe MOG is influenced in the rearward direction and past the rear edge 60 of the plate 52 by air from the blower 38 (FIG. 1). In some embodiments, the duct 54 may be arranged in an angled manner relative to the direction of travel of the combine harvester 10 (FIG. 1). In some embodiments, also as indicated in phantom in FIG. 2B, an aperture (e.g., depicted as an oval in dashed lines, though other geometric configurations and/or different sizes may be implemented in some embodiments) may be disposed in the plate 52 (shown beneath the duct 54, though not limited to that depicted area) between the outlet 64 of the chopper 34 (FIG. 2A) and the outlet end of the plural vanes 36. In this latter embodiment, the aperture may enable the discharge of the shoe MOG into the stream of chopped MOG anywhere in between the outlet 64 and the outlet end of the plural vanes 36 (e.g., anywhere downstream of the chopper 34 from the truncated duct 54). In some embodiments, the duct 54 may be of a wider dimension, and/or of a somewhat triangular-geometry with the "apex" of the triangle receiving the shoe MOG from the shoe outlet 40 (FIG. 2A) and the "base" of the triangle adjacent the rear edge 60 of the plate 52 or elsewhere in the manner as described above. In some embodiments, show MOG may be conveyed from the shoe by one or more additional ducts upstream of the inlet 56 of the duct 54.

Figure 3A:
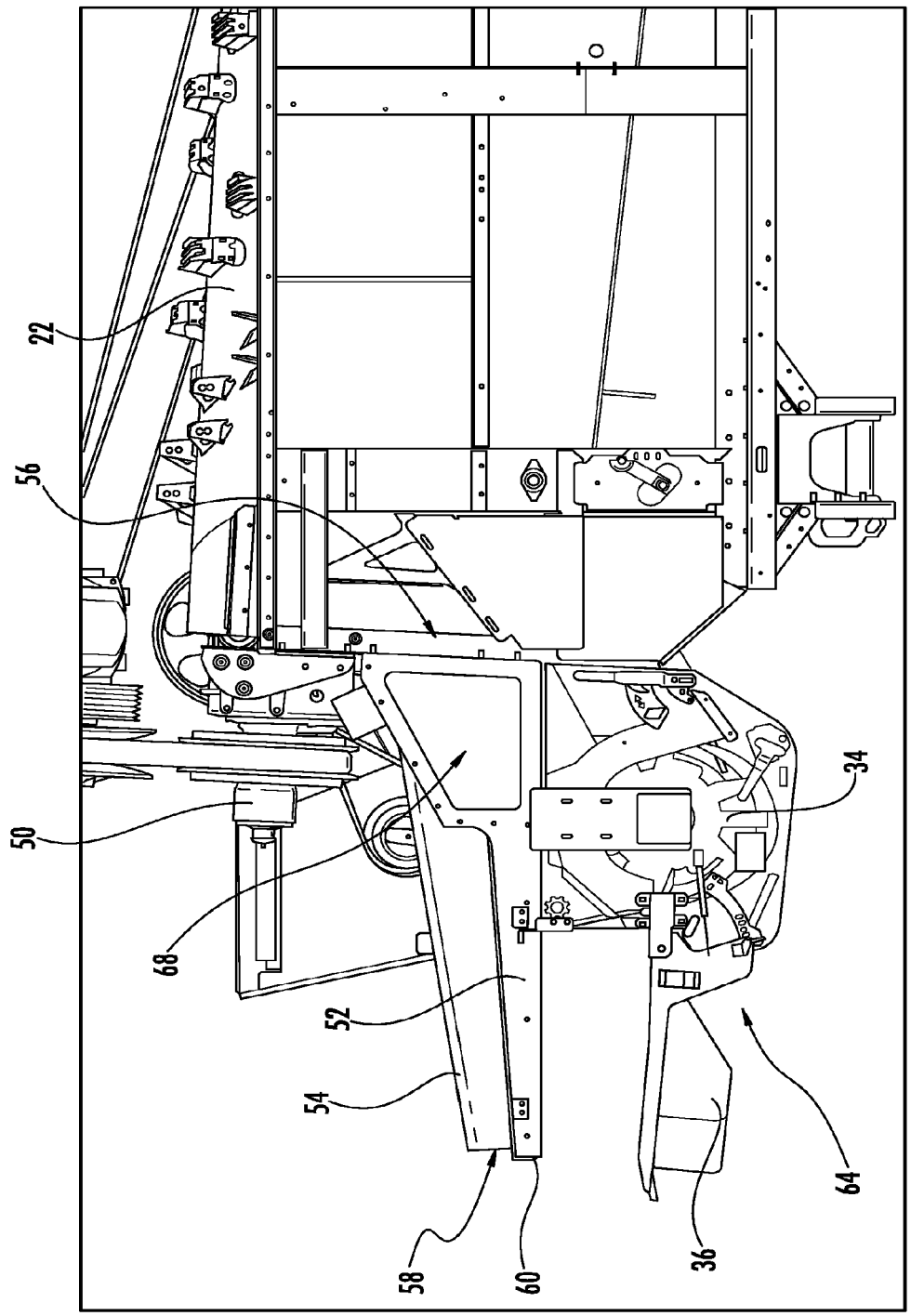
FIG. 3A is a schematic diagram that illustrates, in fragmentary, side-elevation view, another embodiment of a cleaning shoe MOG discharge system.

FIG. 3A shows another embodiment of a cleaning shoe MOG discharge system. In this embodiment, the same or similar components to those shown in FIG. 2A are illustrated, including the rotor 22, rotor drive 50, duct 54, plate 52, chopper 34, and the plural vanes 36. The duct 54 comprises an inlet 56. However, different from FIG. 2A, the duct 54 comprises a side outlet 68 defined by an edge in similar manner as described above in association with FIG. 2B. An axis corresponding to a discharge direction (e.g., the direction of shoe MOG flow) of the side outlet 68 is angled relative to an axis corresponding to a longitudinal (e.g., fore-and-aft) axis of the duct 54. For instance, in one embodiment, an axis corresponding to the discharge direction of the side outlet 68 is at a right angle relative to the longitudinal axis of the duct 54. In some embodiments, an axis corresponding to the discharge direction of the side outlet 68 is at a forty-five (45) degree angle relative to the longitudinal axis of the duct 54. These and other variations in the angle of the side outlet 68 relative to the duct longitudinal axis may be used, and hence are contemplated to be within the scope of the disclosure. In one embodiment, the side outlet 68 may discharge directly to the plate 52, where air from the blower 38 causes the shoe MOG to be blown over the plate 52 and off the rear edge 60 of the plate 52. In some embodiments, the plate 52 may comprise an aperture, somewhat similar to that described for the embodiment in FIG. 2B. The aperture may be disposed anywhere between the outlet 64 of the chopper 34 and the rear edge 60 of the plate 52 (e.g., anywhere downstream from the chopper outlet 64), enabling the shoe MOG to be discharged into the stream of chopped MOG discharged from the chopper 34. In other words, regardless of the location of the aperture, as is true for the embodiments described in association with FIGS. 2A-2B, the end result is the discharge of the shoe MOG into the chopped MOG stream (e.g., downstream of the chopper outlet 64). In some embodiments, the side outlet 68 may be connected to another duct, as described below.

In some embodiments, the duct 54 may comprise one or more additional outlets, such as the outlet 58 as described above in association with FIGS. 2A-2B. Variations of the location of the outlet 58, with or without an aperture in the plate 52 as described above, also apply in this embodiment, and hence are contemplated to be within the scope of the disclosure.

Figure 3B:
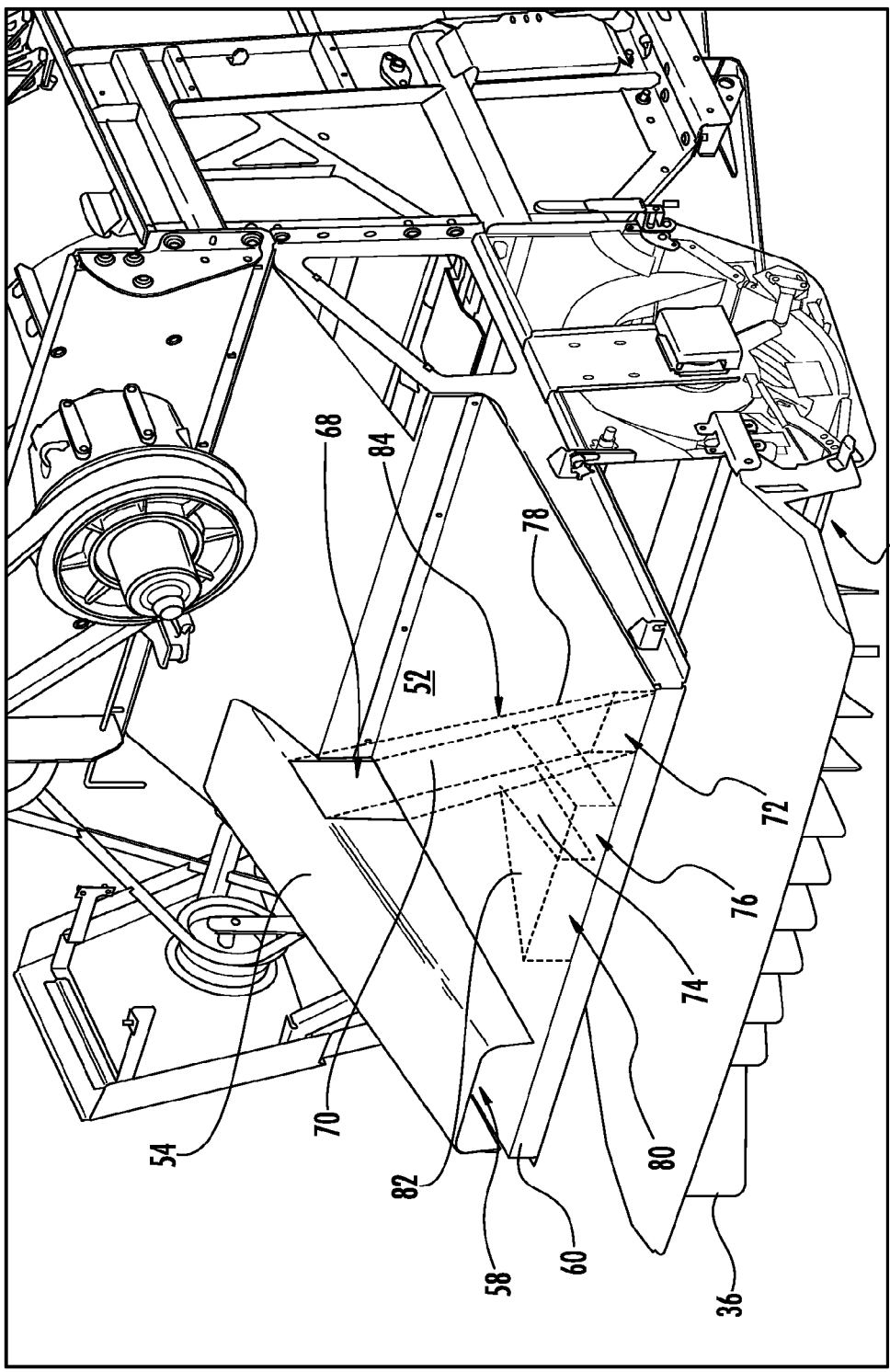
FIG. 3B is a schematic diagram that illustrates, in fragmentary, rear-perspective view, an embodiment of the cleaning shoe MOG discharge system of FIG. 3A.

Referring now to FIG. 3B, the cleaning shoe MOG discharge system of FIG. 3A is shown, with variations depicted at least in part in phantom. Select components are referenced, with prior described components omitted from discussion for brevity. In this embodiment, the duct 54 comprises two outlets, including outlet 58, and discharges the shoe MOG over the rear edge 60 of the plate 52. In other words, the embodiment of FIG. 3B does not use of an aperture in the plate 52, and does not use truncated ducts. In some embodiments, one or more of these features may be included, as describe below. In some embodiments, the outlet 58 may be sealed or otherwise blocked off (or omitted) to prohibit the discharge of shoe MOG material, causing dependency for discharge of the shoe MOG from another duct outlet. As depicted in FIG. 3B, the side outlet 68 is connected to an additional duct 70 (shown in phantom). In one embodiment, the duct 70 comprises a substantially straight, inverted U-channel structure (similar to duct 54) extending from the side outlet 68 to a location adjacent the rear edge 60 of the plate 52. As indicated above, some embodiments may utilize a different geometry for the duct 70. The duct 70 comprises an outlet 72, defined with a multi-sided edge (e.g., three (3) sides (top, and two opposing sides) in this example, though the edge may be defined with other quantities of sides in some embodiments). In some embodiments, the additional duct 70 may be angled instead of straight, such as a bend disposed between the side outlet 68 and the outlet 72 that results in an additional duct portion 74 to extend to (or substantially to) the rear edge 60 of the plate 52 according to a different rear edge location (e.g., different side-to-side location) than when the duct 70 is straight. The duct portion 74 comprises an outlet 76, similar in configuration to outlet 72 (and similar to other outlets described herein, though not limited thereof). In some embodiments, the duct portion 74 and duct 70 may be detachably separate, connected (e.g., according to any well-known attachment mechanisms, such as bolts, screws, adhesives, molded-fit, etc.) ducts, where a rear portion 78 may be omitted in favor of a duct corresponding to the duct portion 74. In some embodiments, the duct 70 may comprise both the rear portion 78 with the outlet 72 and the duct portion 74 (or embodied as a detachably separate, yet connected duct) with outlet 76. In some embodiments, a wider outlet may be implemented that encompasses both the outlets 72, 76, and outlet 80 (and more outlet area, or less, in some embodiments), as reflected by the portion 82 representing one side of a duct portion of duct 70 (or separate duct in some embodiments), the other side comprising a right-hand side of the duct 70, for example. Note that, though the edges of each outlet are shown "squared" to the rear edge 60 of the plate 52, some embodiments may have angled edges (or a mix of squared and angled edges) to further facilitate directional flow of the shoe MOG.

In some embodiments, as described previously, the duct 70 may be truncated, such as at or near location 84, as one example among many, which may be anywhere on the plate 52, or at least downstream of the chopper outlet 64 when used in conjunction with one or more apertures. An aperture may be located adjacent to the truncated edge of the duct 70 at the location 84, enabling the discharge of the shoe MOG into the chopped MOG stream discharged from the chopper 34 (FIG. 3A). In some embodiments, the aperture may be omitted, and the shoe MOG discharged from the truncated duct 70 may be blown across the plate 52 and over the rear edge 60 of the plate 52, and ultimately mixed with the chopped MOG stream that is discharged from the plural vanes 36.

In one embodiment, not illustrated, the linear duct 54 of FIGS. 2A and 2B is duplicated on the right-hand side thus, together, providing a pair of ducts located either side of the generally downward flow of material falling from the rotor 22 to the chopper 34. In other words the pair of ducts convey the shoe MOG around the thresher rotor MOG.

Note that the embodiments and associated variations explained in association with FIGS. 2A-2B and 3A-3B may be mixed in a plurality of different configurations for different embodiments. In some embodiments, though a single aperture is described in conjunction with FIGS. 2A-3B, some embodiments may split the aperture into plural, smaller apertures.

Figure 4:
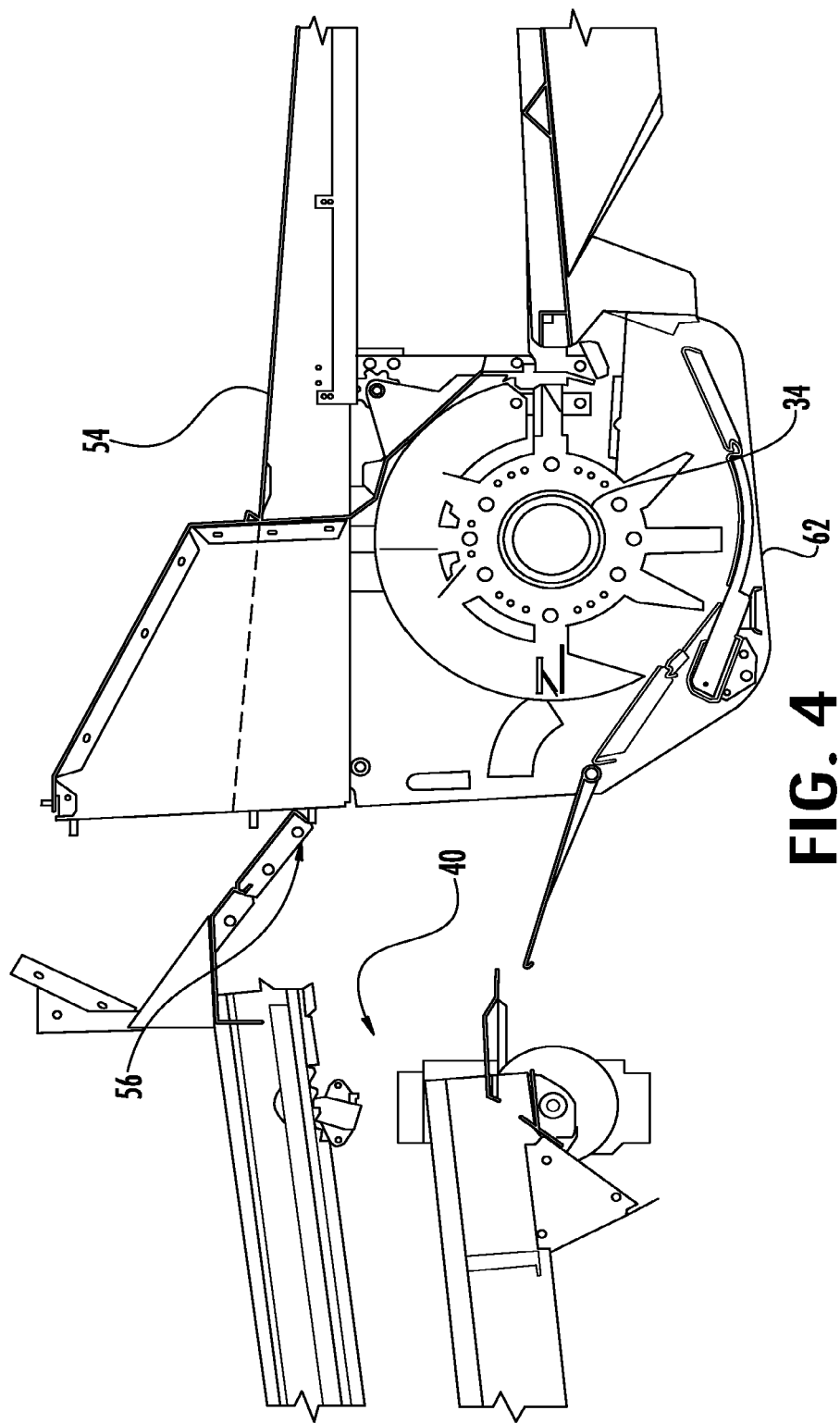
FIG. 4 is a schematic diagram that illustrates, in fragmentary, side-elevation view, an embodiment of a cleaning shoe MOG discharge system.

Referring now to FIG. 4, shown is a side-elevation view of the shoe outlet 40, and the inlet 56 of the duct 54. Also shown is the chopper 34, surrounded in part by the housing 62. In some embodiments, a different arrangement of components may be used to serve the function of conveying the shoe MOG to the duct 54, as should be appreciated by one having ordinary skill in the art, and hence such variations are contemplated to be within the scope of the disclosure. Shoe MOG discharged from the shoe outlet 40 is blown upwards and rearwards to the inlet 56 of the duct 54. The angled, lower element disposed between the outlet 40 and the housing 62 comprises a sheet of metal (or other material) that prevents the MOG from falling directly to the ground.

Figure 5:
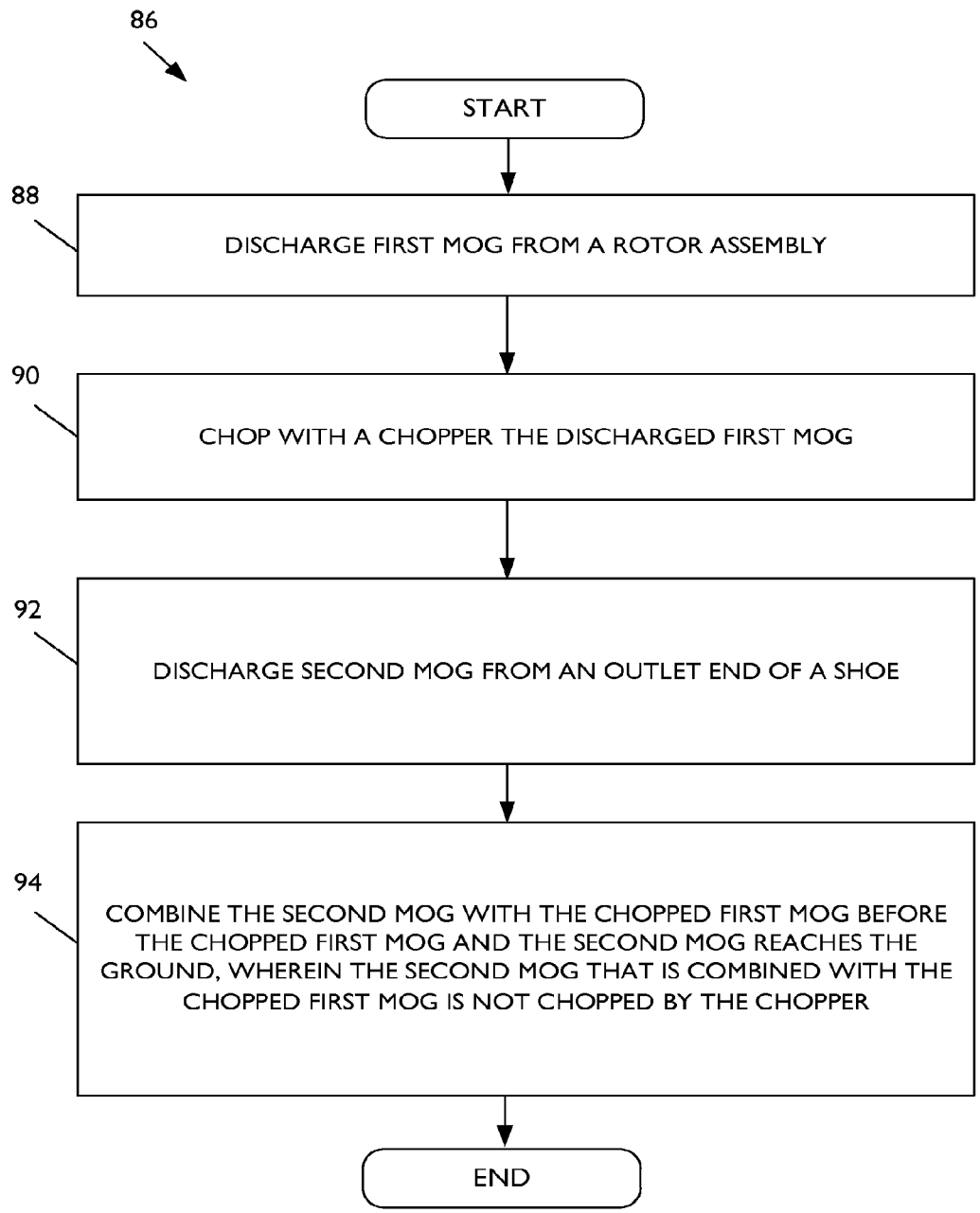
FIG. 5 is a flow diagram that illustrates an embodiment of a cleaning shoe MOG discharge method.

In view of the above description, it should be appreciated that one embodiment of a cleaning shoe MOG discharge method, as depicted in FIG. 5 and denoted as method 86, comprises discharging first MOG from a rotor assembly (88); chopping with a chopper the discharged first MOG (90); discharging second MOG from an outlet end of a shoe (92); and combining the second MOG with the chopped first MOG before the chopped first MOG and the second MOG reaches the ground, wherein the second MOG that is combined with the chopped first MOG is not chopped by the chopper (94).

Any process descriptions or blocks in flow diagrams may be implemented with additional or fewer process steps in some embodiments, and that the method 86 depicted in FIG. 5 is not limited to the architectures shown in FIGS. 1-4, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure.

The invention claimed is:

1. A cleaning shoe, material-other-than-grain (MOG) discharge system of a combine harvester, the system comprising:
   a thresher rotor assembly configured to produce a stream of thresher rotor MOG;
   a shoe disposed beneath the thresher rotor assembly, the shoe configured to produce a stream of shoe MOG;
   a chopper positioned to receive and chop the stream of thresher rotor MOG;
   plural vanes disposed at an outlet of the chopper configured to distribute the chopped thresher rotor MOG;
   a plate comprising a top surface and a bottom surface that is adjacent to the plural vanes; and
   a duct set on the plate, the duct having a first inlet and a first outlet, the first inlet disposed adjacent to an outlet of the shoe to receive the stream of shoe MOG, the first outlet disposed downstream of the outlet of the chopper such that the stream of shoe MOG is received in the stream of chopped thresher rotor MOG and carried away from the combine harvester with said thresher rotor MOG.

2. The system of claim 1, wherein the first outlet is defined by an edge, the edge adjacent to a rear edge of the plate and an outlet end of the plural vanes.

3. The system of claim 1, wherein the thresher rotor assembly comprises one or more axially-arranged thresher rotors.

4. The system of claim 1, further comprising an additional chopper, wherein the plural vanes are disposed at an outlet of the additional chopper.

5. The system of claim 1, wherein the first outlet is disposed between a location substantially between the outlet of the chopper and an outlet end of the plural vanes.

6. The system of claim 1, wherein the first outlet is disposed at an angle relative to the first inlet.

7. The system of claim 1, comprising a substantially vertical and generally transversely-central passage located between a discharge zone of the thresher rotor assembly and the inlet of the chopper, and a pair of ducts each extending in a generally longitudinal direction either side of said passage and each having an inlet disposed adjacent the shoe and an outlet disposed downstream of the outlet of the chopper.

8. A cleaning shoe, material-other-than-grain (MOG) discharge system of a combine harvester, the system comprising:

a thresher rotor assembly;
a shoe disposed beneath the thresher rotor assembly;
a chopper;
plural vanes disposed at an outlet of the chopper;
a plate comprising a top surface and a bottom surface that is adjacent to the plural vanes; and
a duct set on the plate, the duct having a first inlet and a first outlet, the first inlet disposed adjacent to an outlet of the shoe, the first outlet disposed downstream of the outlet of the chopper, and wherein the duct comprises a second outlet, the second outlet comprising an axis corresponding to a discharge direction, the axis angled relative to an axis corresponding to a discharge direction of the first outlet.

9. The system of claim 8, further comprising a second duct set on the plate and connected to the second outlet, the second duct comprising an outlet having an edge defining the outlet of the second duct, wherein the edge is adjacent a rear edge of the plate and an outlet end of the plural vanes.

10. The system of claim 8, further comprising a second duct set on the plate and an aperture in the plate, the second duct connected to the second outlet, the second duct comprising an outlet having an edge defining the outlet of the second duct, wherein the edge is adjacent to the aperture, the aperture disposed between the outlet of the chopper and a rear edge of the plate.

* * * * *